INVENTOR.
PETER J. MURRAY
BY
Seed & Berry
ATTORNEYS

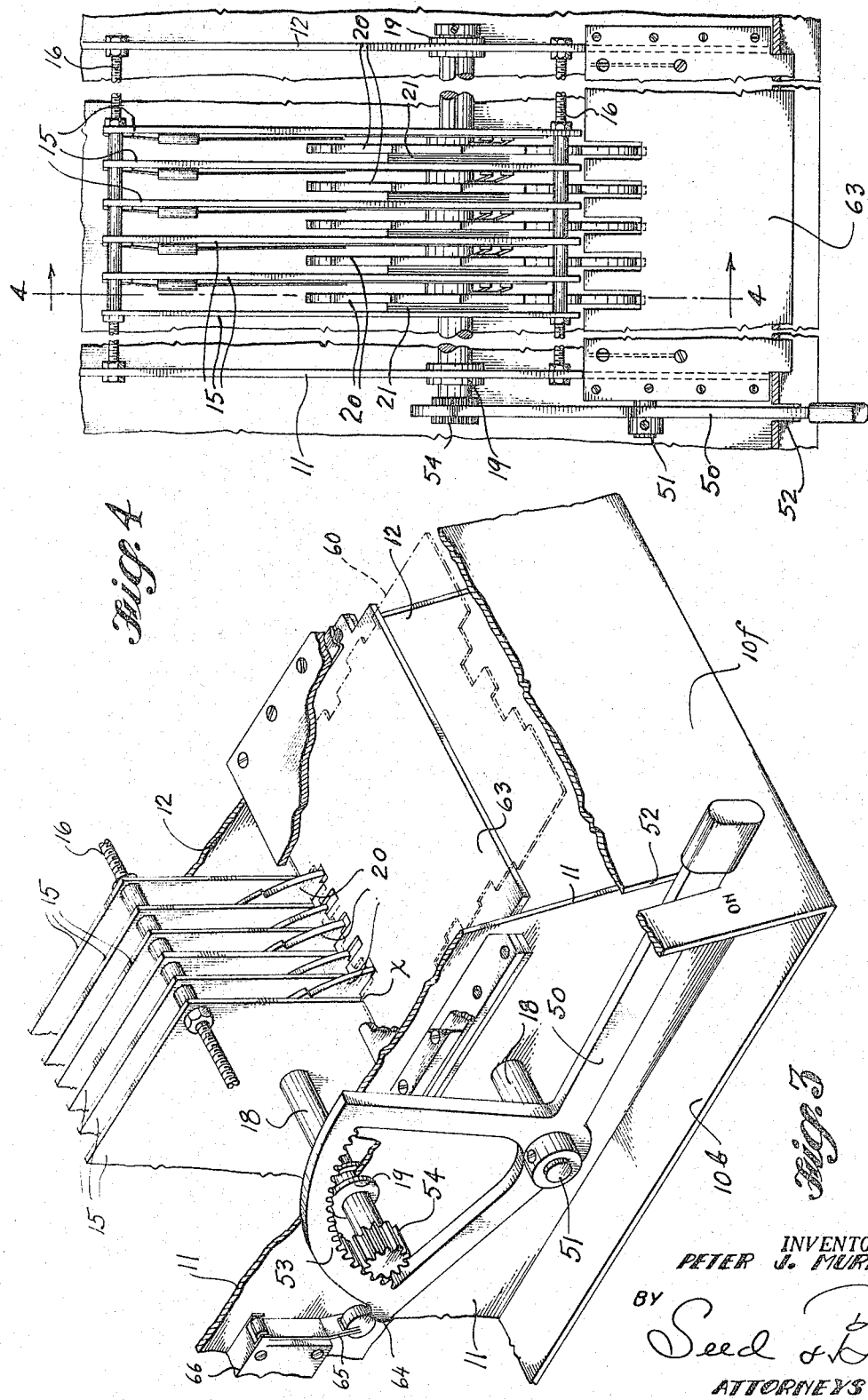

March 7, 1967  P. J. MURRAY  3,308,378
PROGRAM CARD CONTROLLED SWITCH APPARATUS FOR TESTING
TRANSISTORS AND THE LIKE Filed Oct. 23, 1963  5 Sheets-Sheet 4

INVENTOR.
PETER J. MURRAY
BY
Seed & Berry
ATTORNEYS

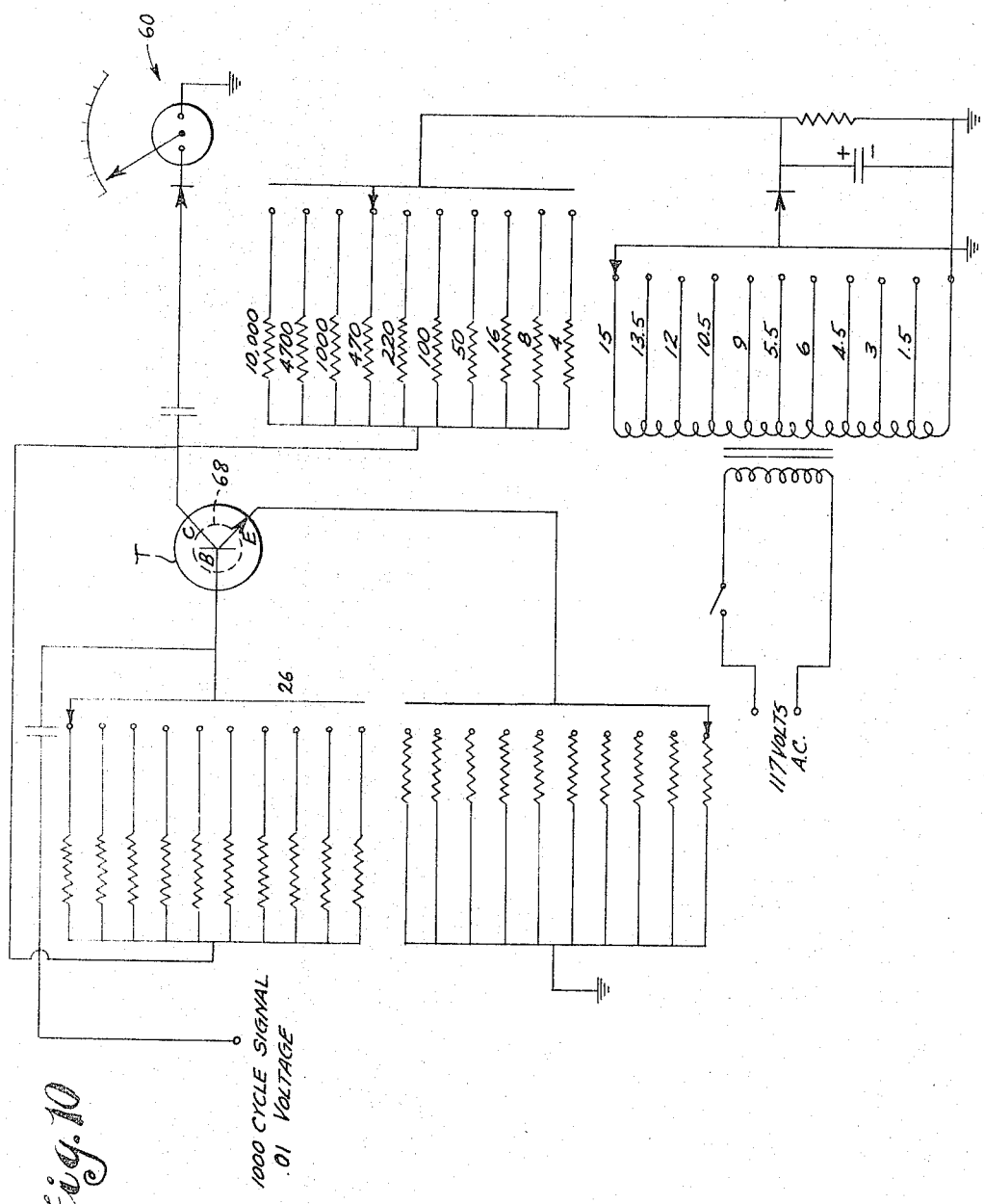

Patented Mar. 7, 1967

3,308,378
PROGRAM CARD CONTROLLED SWITCH APPARATUS FOR TESTING TRANSISTORS AND THE LIKE
Peter J. Murray, 945 110th NE., Bellevue, Wash. 98004
Filed Oct. 23, 1963, Ser. No. 318,215
5 Claims. (Cl. 324—158)

This invention relates to that class of instruments, mechanisms or meters employed for testing transistors, radio tubes and the like, for the particular purpose of rapidly obtaining an evaluation of the overall quality of the article tested thereby.

It is the primary object of this invention to provide a combined electrical and mechanical means, to be employed in conjunction with use of certain test circuit establishing cards, that may be selectively applied to the said means, in order to set up therein the proper testing conditions for several circuits in the particular transistor or tube that is placed under test.

It is a further object of this invention to provide a transistor testing instrument or meter embodying a bank of circuit establishing plates; each plate being equipped with a plurality of testing circuits which are designed for selective use in the testing of a wide variety of different kinds of transistors; each plate having a rotatably movable circuit closing disc associated therewith, movable by an actuator shaft that is common to all of said discs and circuits and by which the test circuits required for testing any designated transistor or tube may be established merely by the insertion of the proper circuit connections by the discs.

A further object of the present invention resides in the particular design of the circuit selector cards and in their manner of use in conjunction with the instrument of this invention, as will hereinafter be fully described.

In accomplishing the above mentioned and other objects of the invention, I have provided the improved details of construction, the preferred forms of which are illustrated in the accompanying drawings, wherein:

FIG. 3 is a fragmentary, perspective view of the forward end portion of the present testing machine, with parts broken away for explanatory purposes and to show the position of use of a selector card, herein shown in dash-dot lines.

FIG. 4 is a top view of the bank of test circuit mounting plates, showing the circuit selector cams as applied to the turning shaft that is common to all shafts.

FIG. 10 is a diagram, schematically showing the various switch plates and circuit connections as employed in this instrument.

It is to be understood that the present testing mechanism is designed especially as a means for obtaining an evaluation of the overall quality of a tube or transistor as differentiated from a mechanism for determining and evaluating the individual characteristics of the article under test.

Figure 1:
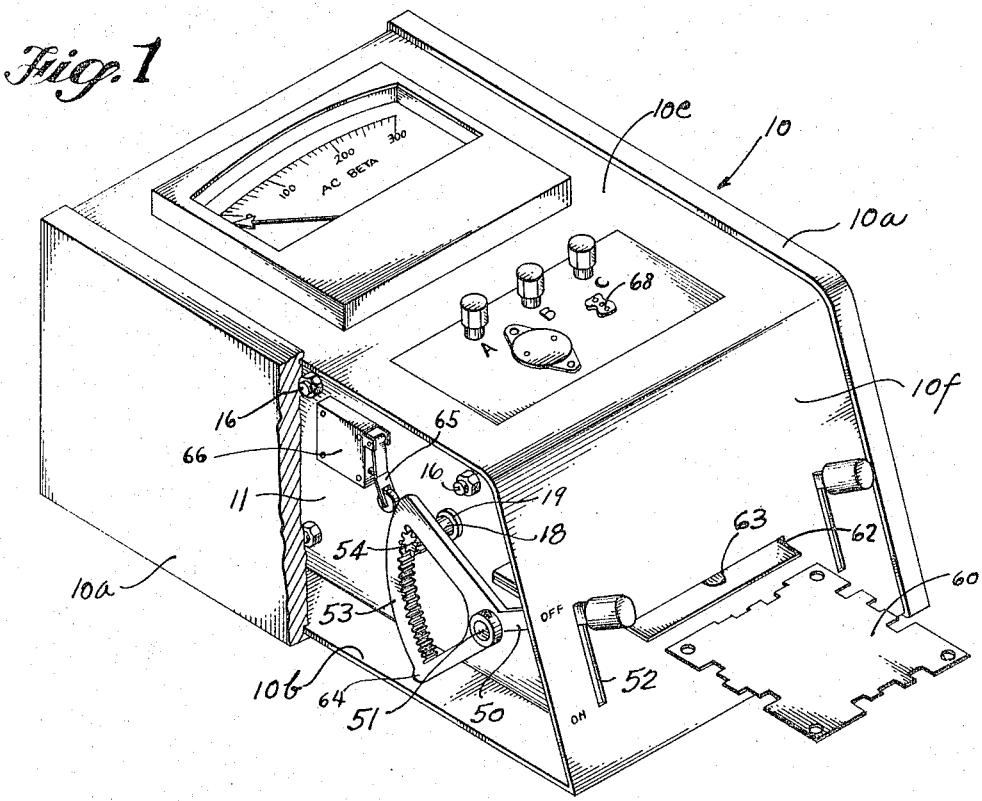
FIG. 1 is a perspective view of a transistor testing instrument embodying the improvements of the present invention therein, and showing a circuit closing card prepared especially for the tube under test, positioned ready for insertion into the instrument to establish proper circuit selections and conditions for the test.

Referring more in detail to the drawings:

In its present preferred form of construction, this testing device or meter comprises an enclosing case or housing of box-like formation, designated in its entirety in FIG. 1 by numeral 10. This housing has opposite sidewalls 10a—10a; a top wall 10c that merges into a downwardly and forwardly sloping front end wall 10f that, is joined at its lower edge with the front end portion of a bottom wall 10b.

Figure 7:
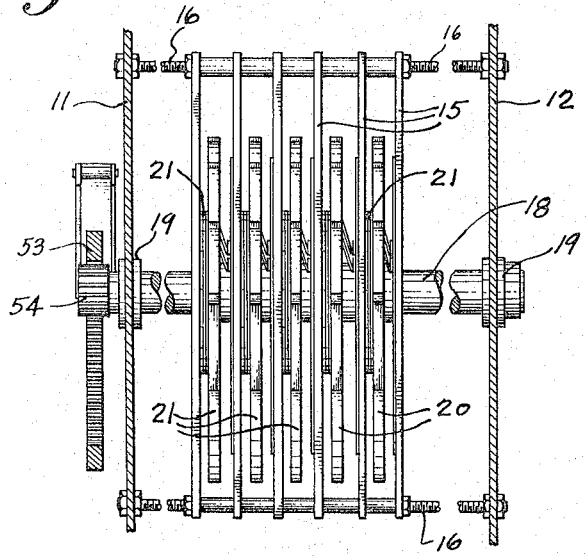
FIG. 7 is a front end view of the bank of switch plates and cams as assembled with the cam rotating shaft and main circuit closing switch.
Figure 8:
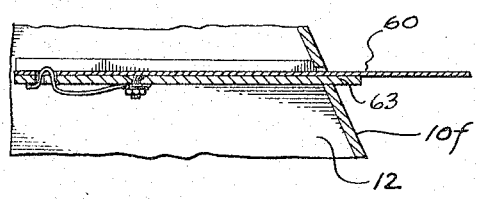
FIG. 8 is a vertical section of one of the circuit selector cards as applied in the machine for circuit establishment showing the card holding latch member.

The movable or operating parts of the present instrument are contained in the housing 10 within a suitable main frame comprising opposite sidewalls 11 and 12 which are mounted vertically and in parallel relationship on the basewall 10b as has been shown best in FIGS. 3 and 4 and 7. This metal frame is covered by the top wall 10c and is closed at its front end by the wall 10f of housing 10.

Contained in the metal frame as in FIGS. 3, 4 and 7, is a bank of parallel laterally spaced rectangular plates 15, rigidly fixed in the desired spacing and supported as a unit between the opposite sidewalls 11 and 12 of the main frame by horizontal cross-rods 16 that extend through their four corner portions, as well shown in FIG. 4, and which rods are fixed at their opposite ends respectively in the laterally spaced sidewalls 11 and 12 of the main frame.

Extended horizontally and rotatably through the bank of plates 15 at a level about mid-way of their top and bottom edges and nearer their forward vertical edges than their rear edges, is a cross-shaft 18 that at its ends is rotatably mounted in bearings 19—19 fixed in the side plates 11–12; as also seen in FIG. 4. Rotatably mounted on this cross-shaft, in each of the spaces between the laterally spaced plates 15, is what I have herein designated to be a cam disc 20; there being five of these discs employed in the present instance as shown in FIGS. 3, 4 and 7. Each disc 20 is rotatably mounted on the cross-shaft 18 but is normally turned therewith through the use of engaging friction discs 21, as shown in separated relationship best in FIG. 5 and as presently described more in detail.

Figure 2:
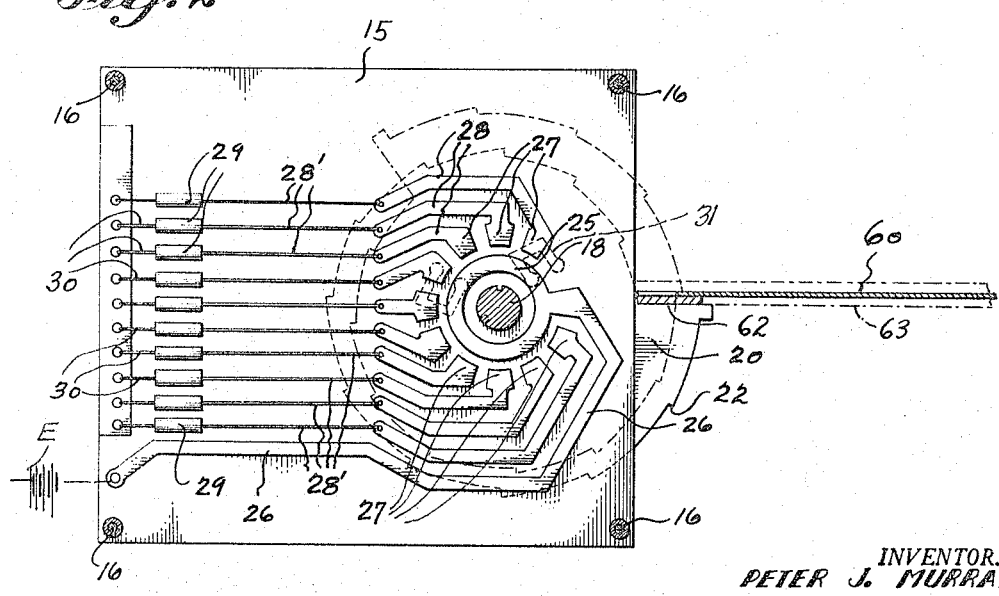
FIG. 2 is a side view of one of the several plates of the instrument as equipped with selective test circuits and showing a circuit selector card in position of its use.
Figure 5:
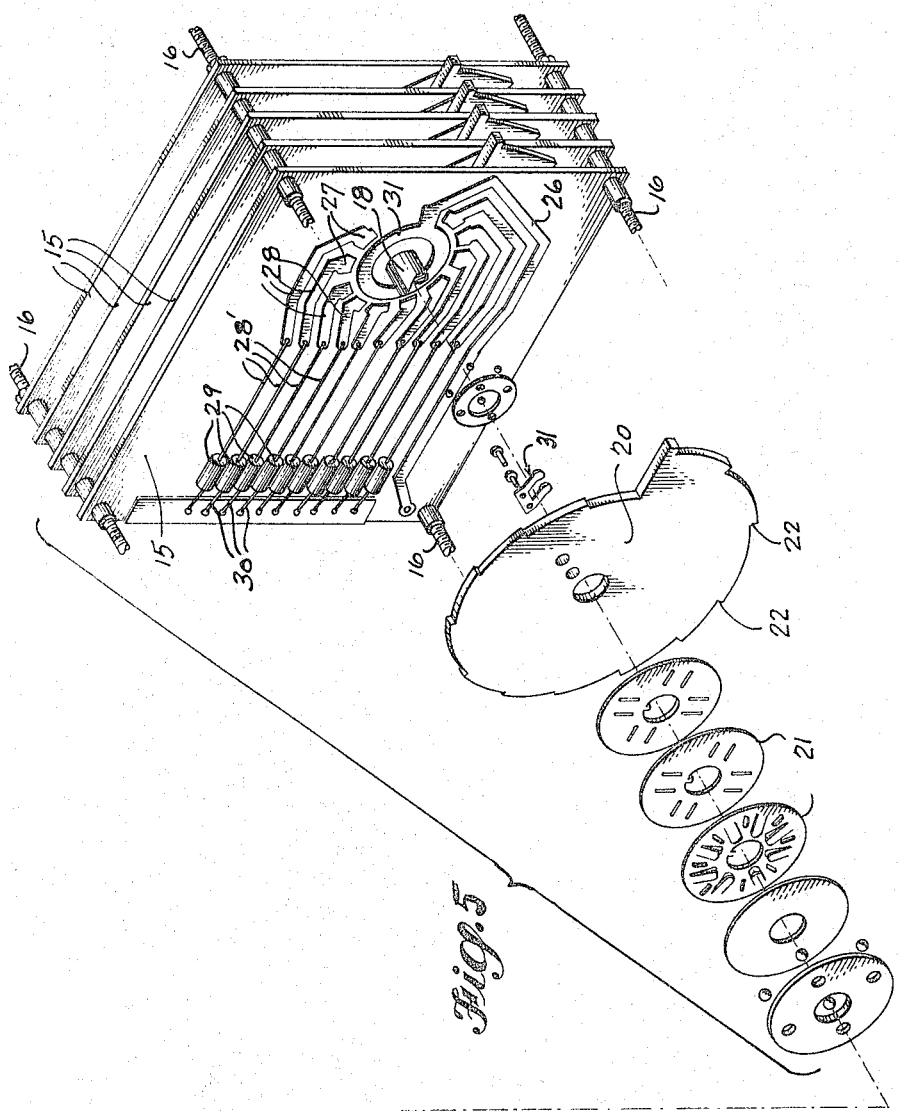
FIG. 5 is a perspective view of the bank of test circuit mounting plates, showing the friction discs of one of the cams in separated relationship removed therefrom for an easier showing of their details of construction.
Figure 6:
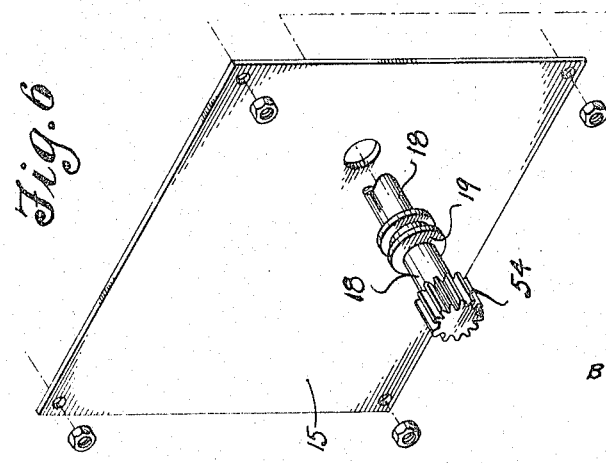
FIG. 6 is a perspective view of a removed side plate of the bank of circuit mounting plates shown in FIG. 5, and the end portion of the cam rotating shaft.

Each disc 20 is formed peripherally with ratchet-like steps providing on each a succession of radially directed stop surfaces or shoulders 22 as best shown in FIGS. 2 and 5. The periphery of each disc is in the form of a helix thus providing that the stops are successively increased in their radial distances from the disc mounting shaft 18. The assembly of friction discs associated with each disc 20, embodies the five spaced discs 21 shown at the left side in FIG. 5, some of which are keyed to shaft 18 to turn therewith and are so formed as to apply frictional driving pressure to the associated cam disc 20.

Applied to the inside face of each of the first five plates 15, and as counted from the right hand side in FIGS. 4 and 7, in a manner shown best in FIGS. 2 and 5, are circuit establishing connections which are selectively left opened or closed in accordance with the positions of adjustment of the next adjacent rotative cam disc 20. All cam discs 20 will normally be rotated from a starting position common to all as is disc 20 in FIG. 2, with the rotation of the cross-shaft 18. This disc rotation is effected through the mediacy of their friction driving discs 21 but turning of any disc may be positively stopped for circuit selection by the selective use of the present circuit selector cards 60, such as that shown in FIGS. 1, 2 and 9, presently to be described.

By reference to FIG. 2, in particular, it is to be understood that a flat, electrically conductive contactor ring 25 is applied flatly to each plate 15 closely about the crossshaft 18 and slightly spaced therefrom. Each ring 25 has a circuit conductor strip 26 leading therefrom to a source of electrical energy, designated in FIG. 2 at E. Arranged circularly on the plates 15 about the cross-shaft 18, outwardly from the ring 25 are contacts 27, herein shown to be ten in number applied to each plate 15; each with a circuit conductor strip 28, and wire 28' leading therefrom and connected through a resistance element 29 of specified value to a conductor 30. Mounted on one face of each of the cam discs is a brush 31 with two yieldable arms so positioned that, as the disc rotates, one arm travels in contact with the adjacent contact ring 25 and the other successively engages the contacts 27, thus to successively close an electric circuit through the brush engaged contact and the corresponding resistor 29 and connection 30.

The means provided for manually effecting rotation of the shaft 18 to effect rotative adjustment of the five cam discs for tube testing is best shown in FIGS. 1 and 3 to comprise a lever arm 50 pivotally mounted for turning on a supporting stud 51 extending directly outward from frame plate 11. The forward end portion of this lever extends through a slot 52 in the front end wall 10f and at its rear end carries an internal gear segment 53 with its teeth operatively meshing with a pinion gear 54 on the end of shaft 18. When this lever arm is pushed from its upper limit of travel to its lower limit of travel as established by plate slot 52, its geared segment 53 rotates shaft 18 to thereby rotate all cam discs 20 clockwise from starting position and in their rotative movement the extent of rotation of each disc is stopped by the engaging of one of the stop shoulders thereon with the notched edge of selector card 60 that has been inserted into the instrument, as in FIG. 2.

Figure 9:
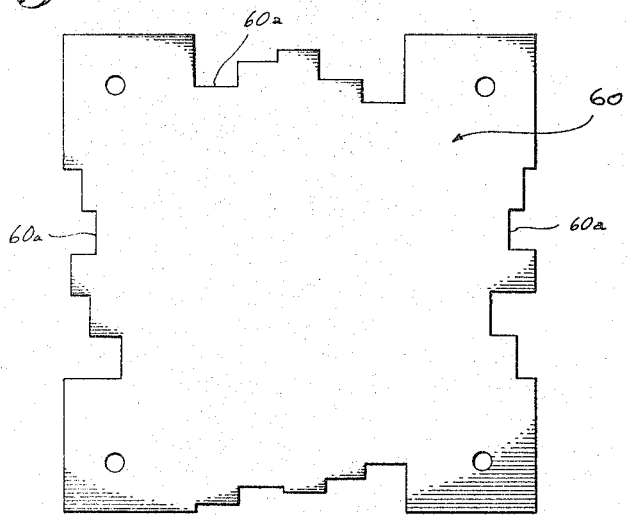
FIG. 9 is a face view of one of a switch selector cards.

The circuit selector cards used for establishing the testing circuit connections are of the character of that shown at 60 in FIGS. 1 and 9 which are of flat plate-like form with each edge differently notched, as shown; each card edge being of such dimensions as to be horizontally inserted edgewise, as indicated in FIG. 4, into a horizontal slot 62 formed in the front end wall plate 10f as slidably rested on a horizontal supporting and guiding plate shown at 63 in FIGS. 1 and 3. It is to be understood that when the selector card is properly inserted it engages against and is stopped in its inward travel by contacting with the forward edges of the two outside plates 15 as at point x in FIGS. 2 and 3. The notches of the card edges are so positioned as to align with the discs 20 and to different predetermined depths and each card edge is marked with a designating number or symbol to designate the number of or designation of the tube to be tested by that card. For example, the proper card for a tube or transistor to be tested is applied as has been shown in FIG. 3. Then the circuit establishing lever arm 50 is pushed down in slot 52, see FIG. 1, to its limit. This causes all discs to be rotated by shaft 18 in unison until each is stopped by the contacting of one of its edge stops 22 with the base edge of the corresponding notch 60a as formed an edge of the inserted card 60. If any disc 20 is thus stopped before the lever action is completed, the shaft 18 merely turns in that disk. As the lever arm 50 moves to its final downward limit in slots 52, a cam 64 on the outer edge of the gear segment 53 engages and actuates a yieldable switch lever 65 to close the main testing circuit through a switch 66 which is shown in FIGS. 1 and 3. Thus, by use of cards properly notched, the proper test circuits for transistors of various kinds and character may be established, it being understood that each transistor has specific parts in various circuits and each has contact posts in standardized arrangement and these may be applied to a socket designated at 68 in FIG. 1 for the test of the specific transistor under test.

In the diagrammatic or schematic illustration of FIG. 10, a transistor T is indicated as being applied to socket 68. After the transistor has been plugged into the socket 68, and test card 60 inserted, the lever 50 is pushed down to its full extent of travel and as it moves, the segment 53 operates through gear 54 to rotate shaft 18 and cause all discs 20 to be rotated clockwise therewith until each is stopped by a stop surface 22 thereof engaging against the base edge of the corresponding notch in the inserted card 60. As each disc 20 turns, one arm of the brush 31 associated therewith moves on the contact ring 25 as its other arm moves successively across the various contacts 27. When all discs 20 have stopped, then the brushes 31 thereof establish the various testing circuits for that particular tube and an overall evaluation of the transistor under test is shown on the instrument 70 which is shown in FIG. 10.

What is claimed is:

1. In a means for testing transistors and the like, a frame structure, a bank of plates fixedly mounted in spaced, parallel relationship in said frame structure, a rotatably mounted shaft extended through said bank of plates, means to rotate said shaft, a disc mounted on said shaft in each of the spaces between said plates, means connecting each disc with said shaft for normal rotation therewith and allowing relative rotation therebetween when the disc is positively stopped, a distributor ring mounted on each plate concentric of said shaft, a plurality of test circuits having end contacts associated with each plate, said contacts of each plurality of test circuits being arranged circularly about the distributor ring of the corresponding plate, a brush on each disc adapted, with the turning of the corresponding disc, to establish a test circuit connection between the corresponding contact ring and successively with the contacts of the test circuits associated with the corresponding plate, and programming means adapted to engage and individually stop the turning of said discs to establish desired test circuits.

2. In a means for testing transistors, a frame structure, a bank of plates fixedly mounted in spaced, parallel relationship in said frame structure, a rotatably mounted shaft extended through said bank of plates and equipped with means for its rotative actuation for making a test, a disc mounted on said shaft in each of the spaces between said plates, each disc being equipped with friction means that causes it to turn with the shaft except when positively stopped, a distributor ring mounted on each plate concentric of said shaft, a plurality of test circuits associated with each plate, each provided with an end contact, said contacts of each plurality of test circuits being arranged circularly about the distributor ring of the corresponding plate, a brush on each disc adapted, with the turning of the corresponding disc, to establish a test circuit connection between the corresponding contact ring and successively with the contacts of the test circuits associated with the corresponding plate, and a circuit selector card adapted to be positioned to engage and individually stop the turning of said discs to establish the test circuits required for the transistor being tested.

3. The combination recited in claim 2 wherein each of said disks is formed with radially directed stopping edges at circumferentially spaced intervals that are gradually increased in distance from the disk axis, and wherein said circuit selector card is notched along one edge and said edge may be positioned edgewise across the turning disks to be engaged by designated stop edges thereof to stop their turning, each to establish a designated test circuit connection for the transistor being tested.

4. In means for testing transistors and the like including a tube mounting socket, a test meter and a source of supply of testing current; said means comprising a frame structure, a bank of plates fixed in spaced adjacency in said frame structure, a shaft, equipped with means for effecting that rotation required for making a test, extended rotatably through said bank of plates, a disk rotatably mounted on said shaft in each of the spaces between plates, a friction means on said shaft for causing each disk to be rotated with the shaft until it is positively stopped, a plurality of selectively useable test circuits mounted on each plate, each circuit having a contact at one end and with a connection at its other end, with said test meter, a distributor ring mounted on each plate concentrically of said shaft, a brush on each disk engaging the corresponding distributor ring and adapted to successively engage the contacts of the test circuits mounted on the corresponding plate, and a circuit selector card adapted to be positioned relative to the disks as rotated by the turning of said shaft to individually stop the turning of said disks to selectively establish the circuit connections between the brushes and designated contacts thus to establish the required test circuits for a designated transistor.

5. A device according to claim 4 wherein the shaft rotating means includes a gear fixed on the shaft, an arm adapted to be depressed from one position to another, a gear segment on said arm in operative mesh with said gear, and by such depression operable to rotate said shaft thus to close the test circuit connection between the source of supply of testing current and the test meter through the selected circuits and transistor being tested.

References Cited by the Examiner
UNITED STATES PATENTS
2,961,500   11/1960   Clark _____ 200—38

WALTER L. CARLSON, *Primary Examiner.*

E. L. STOLARUN, *Assistant Examiner.*